United States Patent
Hsieh et al.

(10) Patent No.: US 7,603,501 B2
(45) Date of Patent: Oct. 13, 2009

(54) COMMUNICATION CIRCUIT OF SERIAL PERIPHERAL INTERFACE DEVICES

(75) Inventors: Ming-Chih Hsieh, Taipei Hsien (TW); Kuo-Sheng Chao, Taipei Hsien (TW)

(73) Assignee: Hon Hai Precsion Industry Co., Ltd., Tu-Cheng, Taipei Hsien (TW)

( * ) Notice: Subject to any disclaimer, the term of this patent is extended or adjusted under 35 U.S.C. 154(b) by 30 days.

(21) Appl. No.: 12/051,852

(22) Filed: Mar. 20, 2008

(65) Prior Publication Data

US 2009/0193165 A1 Jul. 30, 2009

(30) Foreign Application Priority Data

Jan. 30, 2008 (CN) .................... 2008 1 0300263

(51) Int. Cl.
*G06F 13/00* (2006.01)
(52) U.S. Cl. ................. 710/110; 710/2; 710/3
(58) Field of Classification Search ........... 710/110, 710/305–306, 312–315, 2–4
See application file for complete search history.

(56) References Cited

U.S. PATENT DOCUMENTS

| | | | | |
|---|---|---|---|---|
| 5,185,866 | A * | 2/1993 | Francisco ............... | 710/100 |
| 5,455,959 | A * | 10/1995 | Simmering .............. | 710/18 |
| 5,715,475 | A * | 2/1998 | Munson et al. .......... | 710/10 |
| 6,141,736 | A * | 10/2000 | Abert et al. ............. | 711/156 |
| 6,467,065 | B1 * | 10/2002 | Mendez et al. .......... | 714/800 |
| 6,671,761 | B2 * | 12/2003 | Kim ...................... | 710/244 |
| 6,779,046 | B1 * | 8/2004 | Osuga ................... | 710/14 |
| 7,117,283 | B2 * | 10/2006 | Trembley ............... | 710/110 |
| 7,228,373 | B2 * | 6/2007 | Daly et al. .............. | 710/110 |
| 7,290,073 | B2 * | 10/2007 | Bee et al. ............... | 710/110 |
| 7,401,170 | B2 * | 7/2008 | Kusumi et al. .......... | 710/65 |
| 7,519,005 | B2 * | 4/2009 | Hejdeman et al. ....... | 370/252 |
| 2007/0136502 | A1 * | 6/2007 | Wen et al. ............... | 710/110 |
| 2008/0040515 | A1 * | 2/2008 | Schaetzle ............... | 710/3 |
| 2008/0091862 | A1 * | 4/2008 | Hiraka .................. | 710/110 |
| 2008/0183928 | A1 * | 7/2008 | Devila et al. ........... | 710/110 |
| 2009/0125657 | A1 * | 5/2009 | Hsieh .................... | 710/110 |
| 2009/0144471 | A1 * | 6/2009 | Lin ...................... | 710/110 |

* cited by examiner

*Primary Examiner*—Raymond N Phan
(74) *Attorney, Agent, or Firm*—Frank R. Niranjan

(57) ABSTRACT

A communication circuit of a serial peripheral interface (SPI) device includes a master device and a plurality of slave devices. One of the slave devices includes a plurality of general purpose input/output (GPIO) pins. The chip select terminal of the master device is connected to the control terminal of the slave device having the GPIO pins. The GPIO pins respectively are connected to the control terminals of other slave devices. The slave device having the GPIO pins receives an instruction having an address signal from the master device and compares the addresses are identical, the slave device having the GPIO pins communicates with the master device. Otherwise the slave device transmits the address signal to the control terminals of the other slave devices through the GPIO pins. The other slave devices compare the address signal with their own address. The slave device having the identical address communicates with the master device.

5 Claims, 2 Drawing Sheets

COMMUNICATION CIRCUIT OF SERIAL PERIPHERAL INTERFACE DEVICES

BACKGROUND

1. Field of the Invention

The present invention relates to a communication circuit of a serial peripheral interface (SPI) device.

2. Description of Related Art

In computer technology, an SPI is a communication interface for data communications between a master device such as a central processing unit (CPU) of a computer and slave devices such as peripheral chips of the computer. An SPI bus includes a chip select (CS) terminal. When the chip select terminal receives a signal, the SPI bus can receive data and send data.

Referring to FIG. 2, a conventional communication circuit of SPI devices includes a CPU 100, a peripheral interface controller (PIC) 200, and an SPI bus 300. The CPU 100 includes an SPI bus control unit. The SPI bus control unit includes a chip select terminal CS, a serial data output terminal SDO, a serial data input terminal SDI, and a serial clock terminal SCLK. The PIC 200 includes an SPI bus control unit. The SPI bus control unit includes a control terminal P is connected to the chip select terminal CS, a data input terminal DIN is connected to the serial data output terminal SDO, a data output terminal DOUT is connected to the serial data input terminal SDI, and a clock terminal S is connected to the serial clock terminal SCLK. The PIC 200 is connected to an apparatus 400, such as a memory. The PIC 200 receives information from the apparatus 400 and sends the information to the CPU 100. At the same time, the PIC 200 receives instructions from the CPU 100 and transforms the instructions to control signals to control operations of the apparatus 400. However, if more than one PIC 200 is connected to the CPU 100, the CPU 100 cannot distinguish them.

What is needed, therefore, is a communication circuit for SPI devices which can solve the above problem.

SUMMARY

An exemplary communication circuit of a serial peripheral interface (SPI) device includes a master device and a plurality of slave devices. The master device includes an SPI bus control unit. The SPI bus control unit includes a chip select terminal. Each slave device includes an SPI bus control unit. One of the slave devices includes a plurality of general purpose input/output (GPIO) pins. The SPI bus control unit of each of the slave devices includes a control terminal. The chip select terminal of the master device is connected to the control terminal of the slave device having the GPIO pins. The GPIO pins respectively are connected to the control terminals of other slave devices. The master device sends an instruction having an address signal to the slave device having the GPIO pins. The slave device having the GPIO pins compares the address signal of the instruction from the master device with its own address. If the addresses are identical, the slave device having the GPIO pins carries out the instruction from the master device and communicates with the master device. Otherwise the slave device having the GPIO pins transmits the address signal of the instruction to the control terminals of the other slave devices through the GPIO pins. The other slave devices compare the address signal of the instruction from the master device with their own address. The slave device having the identical address carries out the instruction from the master device and communicates with the master device.

Other advantages and novel features of the present invention will become more apparent from the following detailed description of preferred embodiment when taken in conjunction with the accompanying drawings, in which:

DETAILED DESCRIPTION

Figure 1:
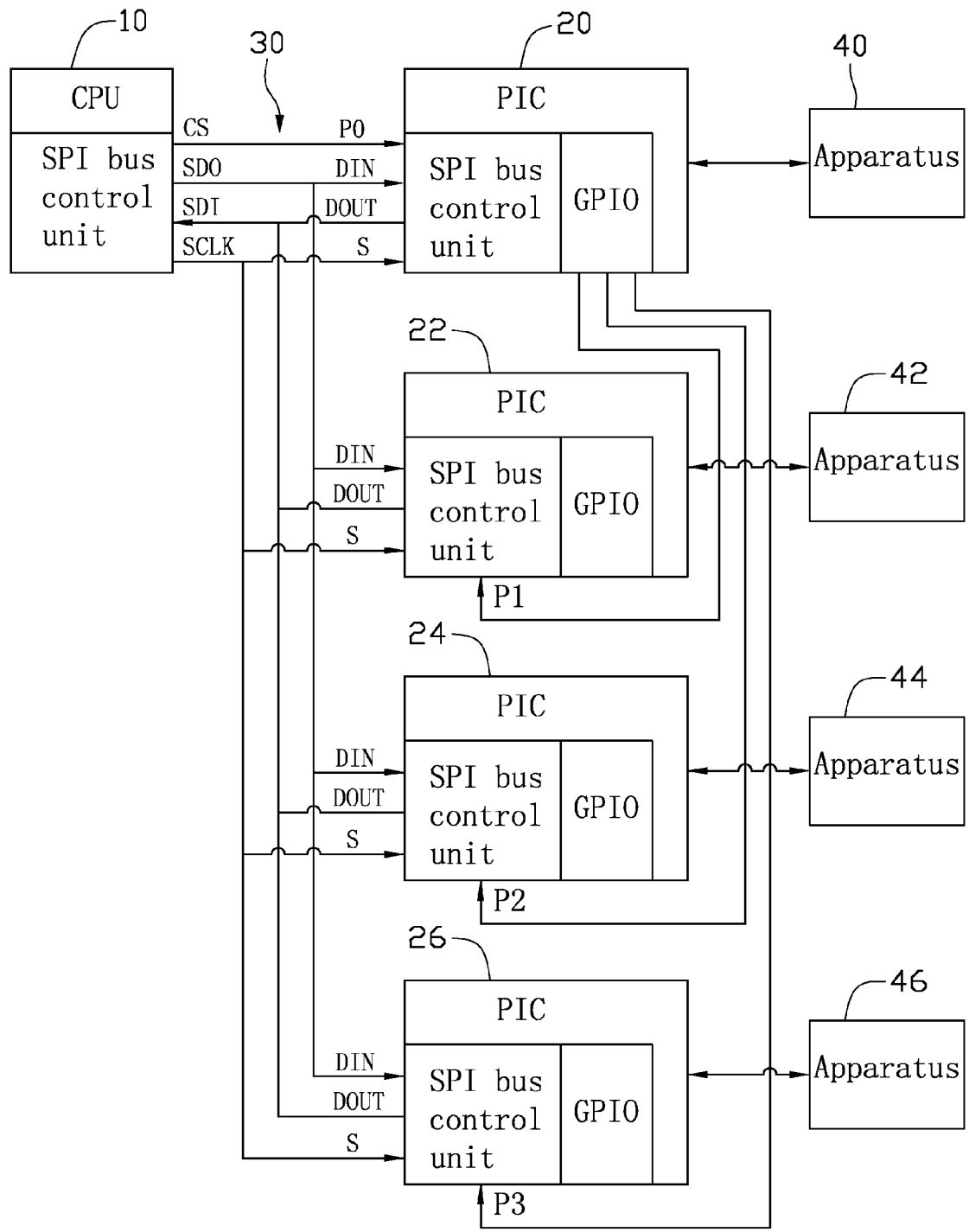
FIG. 1 is a circuit diagram of a communication circuit of SPI devices in accordance with an exemplary embodiment of the present invention.
Figure 2:
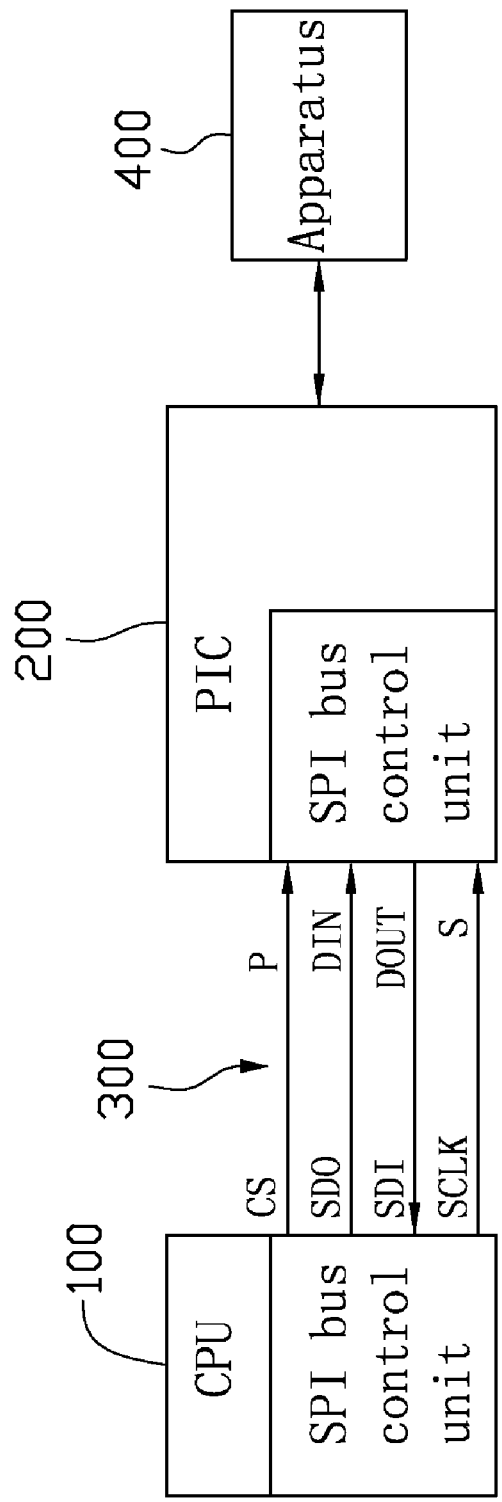
FIG. 2 is a circuit diagram of a conventional communication circuit of SPI devices.

Referring to FIG. 1, a communication circuit of a serial peripheral interface (SPI) device in accordance with an exemplary embodiment of the present invention includes a master device 10, such as a CPU, four slave devices, such as PICs 20, 22, 24, and 26, an SPI bus 30, and four apparatuses 40, 42, 44, and 46. The amount of the slave devices and the apparatuses can be selected according to need.

The CPU 10 includes an SPI bus control unit. The SPI bus control unit includes a chip select terminal CS, a serial data output terminal SDO, a serial data input terminal SDI, and a serial clock terminal SCLK.

Each PIC includes an SPI bus control unit and a plurality of general purpose input/output (GPIO) pins. The SPI bus control unit of the PIC 20 includes a control terminal P0. The SPI bus control unit of the PIC 22 includes a control terminal P1. The SPI bus control unit of the PIC 24 includes a control terminal P2. The SPI bus control unit of the PIC 26 includes a control terminal P3. The SPI bus control unit of each PIC includes a data input terminal DIN, a data output terminal DOU, and a clock terminal S.

In this embodiment, the SPI bus control unit of the CPU 10 is connected to the SPI bus control units of the PICs 20, 22, 24, and 26 through the SPI bus 30. Namely, the chip select terminal CS of the CPU 10 is connected to the control terminal P0. The serial data output terminal SDO of the CPU 10 is connected to the data input terminals DIN of the PICs 20, 22, 24, and 26. The serial data input terminal SDI of the CPU 10 is connected to the data output terminals DOUT of the PICs 20, 22, 24, and 26. The serial clock terminal SCLK of the CPU 10 is connected to the clock terminals S of the PICs 20, 22, 24, and 26. The GPIO pins of the PIC 20 are connected to the control terminals P1, P2, and P3 of the PICs 22, 24, and 26. The PICs 20, 22, 24, and 26 are connected to the apparatuses 40, 42, 44, and 46 respectively. The PICs 20, 22, 24, and 26 receive information from the corresponding apparatuses 40, 42, 44, and 46 and send the information to the CPU 10. At the same time, the PICs 20, 22, 24, and 26 receive instructions from the CPU 10 and transform the instructions to control signals to control the operations of the apparatuses 40, 42, 44, and 46.

In use, the CPU 10 sends an instruction having an address signal to the PIC 20, the PIC 20 compares the address signal with its own identification address. If the address of the PIC 20 are identical with the address signal, the PCI 20 carries out the instruction and communicates with the CPU 10. Otherwise, the PCI 20 transmits the address signal to the control terminals P1, P2, and P3 of the PICs 22, 24, and 26 through the GPIO pins. The PICs 22, 24, and 26 compare the address signal with their own address. The PIC having the identical address carries out the instruction from the CPU 10 and communicates with the CPU 10.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A communication circuit of a serial peripheral interface (SPI) device comprising:

a master device comprising an SPI bus control unit, the SPI bus control unit comprising a chip select terminal; and a plurality of slave devices each comprising an SPI bus control unit, one of the slave devices comprising a plurality of general purpose input/output (GPIO) pins, the SPI bus control unit of each of the slave devices comprising a control terminal, the chip select terminal of the master device connected to the control terminal of the slave device having the GPIO pins, the GPIO pins respectively connected to the control terminals of the SPI bus control units of other slave devices;

wherein the master device sends an instruction having an address signal to the slave device having the GPIO pins, the slave device having the GPIO pins compares the address signal of the instruction from the master device with its own address, if the addresses are identical, the slave device having the GPIO pins carries out the instruction from the master device and communicates with the master device, otherwise the slave device having the GPIO pins transmits the address signal of the instruction to the control terminals of the other slave devices through the GPIO pins, the other slave devices compare the address signal of the instruction from the master device with their own address, the slave device having the identical address carries out the instruction from the master device and communicates with the master device.

2. The communication circuit as claimed in claim 1, wherein the SPI bus control unit of the master device further comprises a serial data output terminal, a serial data input terminal, and a serial clock terminal, the SPI bus control unit of each of the slave devices further comprises a data input terminal is connected to the serial data output terminal of the master device, a data output terminal is connected to the serial data input terminal of the master device, and a clock terminal is connected to the serial clock terminal of the master device.

3. The communication circuit as claimed in claim 1, wherein the amount of the slave devices is four, and the amount of the GPIO pins of a slave device having the GPIO pins is three.

4. The communication circuit as claimed in claim 1, wherein the master device is a central processing unit.

5. The communication circuit as claimed in claim 1, wherein the slave devices are peripheral interface controllers.

* * * * *